Patented Aug. 19, 1952

2,607,760

UNITED STATES PATENT OFFICE 2,607,760

COPOLYMERS CONTAINING POLYMERIZED ALLYLOXYACETIC ACID

Henry Shirley Rothrock, Wilmington, Del., assignor to E. I. du Pont de Nemours and Company, Wilmington, Del., a corporation of Delaware No Drawing. Application May 5, 1951, Serial No. 224,838

7 Claims. (Cl. 260—78.3)

This invention relates to polymeric materials and, more particularly, to a new class of polymers having a wide range of properties.

Synthetic resins are important industrially because of their ability to be tailor-made for specific uses, either by selection of the monomer components or by variations in the proportions of the monomers used. Because of ever-expanding industrial needs, the search for monomers adapted to be polymerized alone or with other polymerizable monomers is a continuous one. Although allyloxyacetic acid is a known chemical compound, it was not known heretofore that it would polymerize either in the presence or absence of other polymerizable monomers. This compound differs from the general class of well-known polymerizable acids containing ethylenic unsaturation in that the ethylenic unsaturation is not alpha,beta to the carboxyl group in allyloxyacetic acid as it is in the hitherto used acids such as acrylic and methacrylic acids. Polymers were known only where the allyloxyacetic acid had been reacted with some unsaturated compound to introduce a group known to be polymerizable, i. e., an ester of allyloxyacetic acid such as the allyl or methallyl ester.

An object of the present invention is to provide new polymeric materials. A further object is to provide new copolymers adapted for a wide range of uses. A more particular object is to provide such copolymers containing carboxyl groups adapted to be esterified and thus give a series of polymeric products of varying properties. A still further object is to provide such copolymers adapted for use in coating compositions. Other objects will be apparent from the description of the invention given hereinafter.

The above objects are accomplished according to the present invention by subjecting allyloxyacetic acid, alone or admixed with one or more other monomers capable of addition polymerization, to polymerization conditions in the presence of a free-radical yielding polymerization catalyst. The polymeric material so obtained is characterized by having —$CH_2OCH_2COOH$ units as lateral substituents of the main polymer chain, such units being joined directly to a carbon of the main polymer chain. The carboxyl groups (COOH) of these units can be readily esterified with alcohols or neutralized with alkaline substances, thus the polymeric material of this invention is adapted to give products of widely varying properties suitable for use in a broad field of practical applications.

The present invention resides in the discovery that allyloxyacetic acid may be readily polymerized either by itself or in admixture with other polymerizable monomers to give polymeric materials of value in a number of different applications. These polymeric materials can comprise as little as 1% allyloxyacetic acid, by weight, such small proportion being sufficient to effect the properties of the material noticeably and, particularly, to render it acidic. A proportion of at least 4% allyloxyacetic acid is generally required to obtain a polymer having good solubility in alkalies whereas at least 30% allyloxyacetic acid is desirable for polymers to be esterified to give products useful in coating systems. Preferably, a copolymer containing 40% to 75% allyloxyacetic acid is used for this latter purpose.

When the allyloxyacetic acid monomer is to be admixed with other polymerizable monomers, one or more of such other monomers can be used. The monoethylenically unsaturated compounds in which the ethylenic unsaturation is terminal, i. e., alpha,beta, as in vinylidene compounds, are the preferred monomers. Copolymers of allyloxyacetic acid with vinyl chloride, vinyl acetate, acrylonitrile, and butyl methacrylate have particularly advantageous properties.

The invention is illustrated in greater detail in the following examples in which all parts are by weight unless otherwise stated.

Example I

A mixture of 200 parts of allyloxyacetic acid, 200 parts of vinyl acetate, and 20 parts of benzoyl peroxide catalyst was heated at 67° C.–89° C. under reflux for two hours. The reaction product was washed with water and then dried by heating on a steam bath under reduced pressure. Conversion of monomers to copolymer was 68.2%. The resulting allyloxyacetic acid/vinyl acetate copolymer had an acid number of 226.8 corresponding to a content of 47% of allyloxyacetic acid. This copolymer was a very viscous, resinous, pale yellow substance readily soluble in acetone. It had a viscosity of 0.5 poise determined at 25° C., at a concentration of 50% in acetone.

Example II

A mixture of 250 parts of allyloxyacetic acid, 250 parts of butyl methacrylate, and 30 parts of di-tert.-butyl peroxide catalyst was added portionwise over a period of one hour to 500 parts of allyloxyacetic acid maintained at about 155° C. The reaction mixture was heated for an additional forty minutes and the resultant viscous product taken up in methanol and precipitated by the addition of a large quantity of benzene. The precipitate was heated on a steam bath under water pump vacuum to remove volatile components, giving 420 parts of an oily, viscous reddish allyloxyacetic acid/butyl methacrylate copolymer. This copolymer had an acid number of 325 corresponding to a content of 67% allyloxyacetic acid. It had a viscosity of about 6 poises determined at 25° C., at a concentration of 75% in n-butanol.

Example III

A mixture of 100 parts of allyloxyacetic acid and 0.5 part of benzoyl peroxide catalyst was heated at 88° C.–108° C. over a period of 421 minutes under nitrogen with stirring, one part portions of benzoyl peroxide being added after 36 minutes, 67 minutes, 86 minutes, and 186 minutes of heating. The unreacted monomer was removed by heating the reaction product at 150° C. under 2 mm. pressure. There was recovered 34.5 parts of the homopolymer of allyloxyacetic acid as an orange-colored liquid having a viscosity of 72 poises at 25° C. The homopolymer was soluble in water and had an acid number of 450.

Example IV

A pressure reactor was swept with oxygen-free nitrogen and charged with a solution of 30 parts of allyloxyacetic acid, 270 parts of vinyl acetate, and 1.5 parts of alpha,alpha'-azodiisobutyronitrile catalyst, dissolved in 200 parts of pure tertiary butyl alcohol. The reactor was then capped and heated at 70° C. for 24 hours, at the end of which period a viscous solution of allyoxyacetic acid/vinyl acetate copolymer had been formed. This solution was stripped with steam until free of solvent and unreacted monomers, and dried on a rubber mill at 100° C.–125° C. There were obtained 240 parts of dry copolymer which was clear, rather tough, and readily dissolved in dilute ammonium hydroxide and in acetone and benzene. The copolymer had an acid No. of 49.6 corresponding to a copolymer comprising 10% of allyloxyacetic acid. It had an inherent viscosity of 0.52 determined at 25° C., at a concentration of 0.2% in chloroform.

Example V

A copolymer of allyloxyacetic acid/vinyl acetate was prepared as in Example IV except that the charge consisted of 20 parts of allyloxyacetic acid, 380 parts of vinyl acetate, and 2 parts of alpha,alpha'-azodiisobutyronitrile catalyst, dissolved in 400 parts of tertiary butyl alcohol. There were obtained 340 parts of dried copolymer having an acid number of 24.1 corresponding to a copolymer comprising 5.1% allyloxyacetic acid. It had an inherent viscosity of 0.56 determined as in Example IV.

Example VI 1.5 parts of allyloxyacetic acid, 73.5 parts of vinyl acetate, and 0.38 part of alpha,alpha'-azodiisobutyronitrile catalyst were dissolved in 100 parts of tertiary butyl alcohol and charged into a pressure bottle. The bottle was cooled, flushed with nitrogen, and heated at 70° C. under autogenous pressure, with agitation, for 24 hours. The resulting copolymer solution was stripped with steam until free of solvent and unreacted monomers and dried at 100° C.–125° C. on a rubber mill. There were obtained 66.6 parts of clear, hard allyloxyacetic acid/vinyl acetate copolymer. This copolymer had an acid number of 8.2 corresponding to a content of 1.7% allyloxyacetic acid. It had an inherent viscosity of 0.86 determined at 25° C., at a concentration of 0.2% in chloroform.

Example VII

A charge of 40 parts of allyloxyacetic acid, 160 parts of vinyl chloride, 160 parts of thiophene-free benzene, 5 parts of tertiary butyl alcohol, and 2 parts of alpha,alpha'-azodiisobutyronitrile catalyst was placed in a stainless steel rocker bomb under oxygen-free nitrogen, all but the vinyl chloride being charged to the open reactor and the latter then valved-in after cooling with Dry Ice and evacuating with head assembly on. The mixture was heated to 60° C. and kept at this temperature for 18 hours with rocking. During this reaction period there was an observed pressure drop of 60 lbs./sq. in. The product, obtained by precipitating in methanol, redissolving in acetone, recoagulating in methanol and drying in a vacuum chamber at a pressure of less than 1 mm., amounted to 57 parts. This allyloxyacetic acid/vinyl chloride copolymer analyzed 48.39% chlorine corresponding to a vinyl chloride content of 85.2%. It had a viscosity of 5.0 poises at 25° C., at a concentration of 30% in cyclohexanone.

Example VIII

A stainless steel reactor was swept with oxygen-free nitrogen and charged with 36 parts of allyloxyacetic acid, 144 parts of allyl glycidyl ether, 262 parts of thiophene-free benzene, and 6 parts of alpha,alpha'-azodiisobutyronitrile. The reactor was then evacuated to a pressure of 90–100 mm., closed, cooled in a solid carbon dioxide/acetone bath and charged with 422 parts of vinyl chloride introduced by distillation. The reactor was heated at 57° C.–63° C. (average 60° C.) and maintained at that temperature for 18 hours with agitation, the maximum internal pressure being 60 lbs./sq. in. After cooling to room temperature and releasing the residual pressure, the benzene solution of the reaction product was poured into a 4- to 6-fold volume of methanol, whereupon the polymer coagulated. The polymer was separated, air-dried, and redissolved in acetone. The acetone solution was poured into methanol and the reprecipitated polymer was filtered and dried under reduced pressure. There was obtained 148 parts of vinyl chloride/allyl glycidyl ether/allyloxyacetic acid copolymer containing 76.9% vinyl chloride as calculated from its chlorine content of 43.6%.

The copolymer of this example was initially soluble in solvents such as acetone, cyclohexanone or a 1:1 mixture of xylene and methyl isobutyl ketone. Upon baking coatings of this copolymer at 149° C. for 30 minutes, there were obtained tough films insoluble in the above-mentioned solvents. By addition to the copolymer of 2% of butanol-modified urea-formaldehyde resin followed by baking 30 minutes at 121° C., there were obtained well-cured coatings having outstanding organic solvent insolubility as well as excellent hardness and heat resistance.

Example IX

A copolymer was prepared as described in Example VIII, using 18 parts of allyloxyacetic acid, 162 parts of allyl glycidyl ether, 420 parts of vinyl chloride, 6 parts of alpha,alpha'-azodiisobutyronitrile catalyst, and 262 parts of benzene. This mixture was heated at 60° C. for 18 hours, the maximum internal pressure being 70 lbs./sq. in. There were obtained 191 parts of an allyloxyacetic acid/vinyl chloride/allyl glycidyl ether containing 81.5% of polymerized vinyl chloride and having a viscosity of 1.83 poises in 30% cyclohexanone solution at 25° C. This copolymer, when mixed with 2% of a butanol-modified urea-formaldehyde resin and baked 30 minutes at 149° C., gave flexible films insoluble in the common organic solvents.

In Examples VIII and IX the proportions of polymerized allyloxyacetic acid and allyl glycidyl ether in the copolymers are substantially the same as their relative proportions in the monomeric mixture but the vinyl chloride has a tendency to polymerize somewhat faster than the other components and, therefore, to appear in the copolymers in somewhat greater proportion than in the monomeric mixtures. Accordingly, the polymeric components of the copolymer of Example VIII consist of, by weight, 76.9% polymerized vinyl chloride (based on chlorine analysis) and approximately 4.62% polymerized allyloxyacetic acid and 18.48% polymerized allyl glycidyl ether; the polymeric components of the copolymer of Example IX consist of, by weight, 81.5% polymerized vinyl chloride (based on chlorine analysis) and approximately 1.85% polymerized allyloxyacetic acid and 16.65% polymerized allyl glycidyl ether.

Example X

A pressure reactor was swept with oxygen-free nitrogen and charged with a mixture of 30 parts of allyloxyacetic acid, 70 parts of vinyl chloride, 100 parts of thiophene-free benzene, 5 parts of tert.-butyl alcohol, and 1 part of alpha,alpha'-azodiisobutyronitrile catalyst. The reactor was then capped and heated with agitation in a 60° C. water bath for 60 hours. At the end of this time a viscous, amber solution of allyloxyacetic acid/vinyl chloride copolymer had been formed. This solution was poured into methanol to precipitate the copolymer which was removed, washed several times with fresh methanol to remove unreacted monomers, and then dried in vacuo at 40° C. 43 parts of copolymer insoluble in aqueous sodium hydroxide were thus obtained. The copolymer had a chlorine content of 45.02% corresponding to a copolymer of 21% allyloxyacetic acid and 79% vinyl chloride. It had a viscosity of 3.0 poises at 25° C. at a concentration of 30% in cyclohexanone.

This copolymer although somewhat lower than desirable in allyloxyacetic acid content was nevertheless useful for conversion to polyesters which find application in coating compositions.

Example XI

An allyloxyacetic acid/vinyl chloride copolymer was prepared as in Example X using a charge of 40 parts of allyloxyacetic acid, 60 parts of vinyl chloride, 100 parts of thiophene-free benzene, 5 parts of tert.-butyl alcohol, and 1.5 parts of alpha,alpha'-azodiisobutyronitrile catalyst. The reaction mixture was poured into methanol which precipitated the copolymer only partially; water was then added to the copolymer to complete the precipitation and the copolymer was then washed with water several times, dissolved in acetone, reprecipitated, washed further with water, and then dried at 40° C. in vacuo. 36 parts of copolymer insoluble in aqueous sodium hydroxide, were thus obtained. The copolymer had a chlorine content of 38.24% corresponding to a copolymer of 32.7% allyloxyacetic acid and 67.3% vinyl chloride. It had a viscosity of 1.13 poises at 25° C. at a concentration of 30% in cyclohexanone. This copolymer was highly suitable for conversion into polyesters valuable for use in coating compositions.

Example XII

An allyloxyacetic acid/vinyl chloride copolymer was prepared as in Example X using a charge of 50 parts of allyloxyacetic acid, 50 parts of vinyl chloride, 100 parts of thiophene-free benzene, 5 parts of tert.-butyl alcohol, and 2 parts of alpha,alpha'-azodiisobutyronitrile catalyst. The reaction mixture was transferred from the reactor to a stillpot and held at 20 mm. pressure with gentle warming until the benzene had been removed. The residue was then poured into water to precipitate the copolymer which was washed thoroughly with water to remove unreacted monomers and thereafter dried at 40° C. in vacuo. 53 parts of copolymer soluble in aqueous sodium hydroxide was thus obtained. The copolymer had a chlorine content of 34.2% corresponding to a copolymer of 40.1% of allyloxyacetic acid and 59.9% of vinyl chloride. It had a viscosity of 0.7 poise at 25° C. at a concentration of 30% in cyclohexanone.

The content of allyloxyacetic acid in this copolymer is within the preferred range and the copolymer was particularly adapted for conversion into polyesters for use in coating compositions.

Example XIII

An allyloxyacetic acid/vinyl chloride copolymer was prepared as in Example X using a charge of 60 parts of allyloxyacetic acid, 40 parts of vinyl chloride, 100 parts of thiophene-free benzene, 5 parts of tert.-butyl alcohol, and 3 parts of alpha,alpha'-azodiisobutyronitrile catalyst. The copolymer was recovered from the reaction mixture and purified as in Example XII. 56 parts of copolymer soluble in aqueous sodium hydroxide were thus obtained. This copolymer had a chlorine content of 29.80% corresponding to a copolymer of 47.5% allyloxyacetic acid and 52.5% of vinyl chloride. It had a viscosity of 0.4 poise at 25° C. at a concentration of 30% in cyclohexanone.

This copolymer was similar to that of Example XI in being adapted for conversion into polyesters highly useful in coating compositions.

Example XIV

A mixture of 125 parts of allyloxyacetic acid, 125 parts of styrene, and 15 parts of di-tert.-butyl peroxide was added over the course of 1.75 hours to 250 parts of allyloxyacetic acid held at 150° C. The mixture was held at this temperature for an additional half hour after all of the mixture had been added. When the reaction mixture cooled to room temperature, it was very viscous, amber in color and slightly cloudy. It was poured into water and the precipitated copolymer washed with hot water. A taffy-like product resulted and this was washed with water and dried at 40° C. at 20 mm. pressure. 227 parts of a brittle, pale-amber solid copolymer having a neutral equivalent of 284, was thus obtained. On the basis of the neutral equivalent, the copolymer had a content of 41.8% allyloxyacetic acid. The copolymer was soluble in aqueous alkali and had a viscosity of 0.14 poise at 25° C. at 30% concentration in cyclohexanone.

This copolymer was also useful for conversion into polyesters for use in coating compositions.

Example XV

A solution of 0.7 part of ammonium persulfate and 0.2 part of sodium bisulfite in 700 parts of water was placed in a reactor provided with agitating means and an inlet tube to blanket the solution with oxygen-free nitrogen. To the nitrogen-blanketed solution there were added 66.5 parts of acrylonitrile and 3.5 parts of allyloxyacetic acid and the mixture polymerized in a nitrogen atmosphere at 40° C.–42° C. for 6 hours under nitrogen. The resulting product was steamed, the polymer removed by filtration, washed thoroughly with water and then with methanol. The copolymer was dried in air and analysis showed it to contain 24.55% nitrogen corresponding to an acrylonitrile content of 92.8%. The yield of product was 63.1 parts and the viscosity at 25° C. at 2% concentration in dimethylformamide was 2.77. This copolymer was particularly adapted for use in films and fibers.

The above examples are merely illustrative and the invention broadly resides in a polymeric material comprising at least 1% polymerized allyloxyacetic acid by weight thereof and, in more specific form, a copolymer, the polymeric components of which comprise at least 30% polymerized allyloxyacetic acid by weight thereof and a polymerized monoethylenically unsaturated compound in which the ethylenic unsaturation is alpha,beta as in vinylidene compounds.

Because of the presence of —CH$_2$OCH$_2$COOH groups jointed directly to carbons of the main polymer chain, the instant polymeric material is acidic in character and the carboxyl groups can be neutralized with alkaline substances to form salts or can be esterified with alcohols. Typical salts are the sodium, potassium, calcium, magnesium, ammonium and amine salts. As little as 1% by weight of allyloxyacetic acid in a copolymer noticeably affects the properties thereof and renders the copolymer acidic. From this minimum proportion of allyloxyacetic acid the polymeric material of this invention ranges up to the homopolymer of allyloxyacetic acid, the properties of the polymeric material varying appreciably as the proportion of allyloxyacetic acid is increased. In general, the molecular weight of the polymeric material tends to decrease as the proportion of allyloxyacetic acid increases. It is preferred if a copolymer is to be formed, that the proportion of allyloxyacetic acid should not exceed 75% by weight although copolymers in which the proportion of allyloxyacetic acid is greater, are useful.

The invention comprises polymerizing allyloxyacetic acid alone or in admixture with one or more other monomers capable of addition polymerization. The particular monomer or monomers selected will influence the properties of the resulting copolymer to a greater or lesser extent depending upon the proportions thereof employed. The monoethylenically unsaturated compounds in which the ethylenic unsaturation is alpha,beta are the preferred monomers to be copolymerized with the allyloxyacetic acid.

The monomers well adapted for use in the present invention include the olefin hydrocarbons, especially those containing 2 to 4 carbon atoms, inclusive, such as ethylene and the butenes, and such polymerizable compounds well known in the art as vinyl chloride, vinyl acetate, vinyl propionate, vinyl benzoate, vinyl trimethylacetate, vinyl isobutyrate, methyl vinyl ketone, methyl isopropenyl ketone, styrene, methyl acrylate, acrylonitrile, acrylamide, methyl methacrylate, methacrylonitrile, methacrylamide, vinyl chloride, vinyl fluoride, vinylidene chloride, 1-chloro-1-fluoro-ethylene, tetrafluoroethylene, chloro-trifluoroethylene, allyl acrylate, allyl succinate, methallyl benzoate, methallyl adipate, allyl vinyl ether, diallyl succinate, and allyl acetate.

Where a copolymer of allyloxyacetic acid is to be prepared, the proportion of allyloxyacetic acid, within certain ranges, will be determined by the intended use of the copolymer to be formed. An important application for these copolymers is in warp sizes, especially for synthetic fibers such as polyethylene glycol terephthalate fibers. For this use, the copolymer is generally dissolved in an aqueous alkaline medium and for a copolymer of good solubility, a proportion of at least 4% allyloxyacetic acid by weight is necessary. The two-component copolymers of allyloxyacetic acid and vinyl acetate comprising 4% to 15% of allyloxyacetic acid are especially effective for use in sizes. Such copolymers are more fully described and specifically claimed in application Serial No. 224,837, filed of even date herewith in the names of P. S. Pinkney and H. S. Rothrock. Examples IV and V illustrate such copolymers.

Valuable copolymers in which the proportion of allyloxyacetic acid can be considerably below 4% by weight are illustrated in Examples VIII and IX. These are three-component copolymers with vinyl chloride and allyl glycidyl ether and are particularly suited for use in thermosetting film-forming compositions. Such copolymers are more fully described and specifically claimed in application Serial No. 170,704 filed June 27, 1950, in the names of E. K. Ellingboe and H. S. Rothrock.

Another group of copolymers coming within the scope of this invention and of outstanding merit are those whose allyloxyacetic acid content is at least 30% by weight and, preferably, at least 40%, and generally not in excess of 75%. These copolymers are particularly adapted for conversion to polyesters which find application in coating compositions. Especially useful are the esters with allyloxyethanol which give attractive air-drying coating compositions. The preparation of such polyesters and their properties are illustrated below.

An allyloxyethanol ester of the copolymer of Example I was prepared by heating for 15.5 hours at 134° C.–146° C. a mixture of 75 parts of the allyloxyacetic acid/vinyl acetate copolymer of Example I, 37.2 parts of allyloxyethanol and 100 parts of xylene. Water was distilled off during the esterification. The product had a final acid number of 18.4 and a viscosity of 43.7 poises at 25° C. at 71% concentration in xylene. Thin films of 1–2 mil. thickness of this ester, containing .05% cobalt as cobalt naphthenate, air-dried to a tack-free condition in about 10 hours. These films after air-drying 12 days were observed to be tough, inert to xylene, and not softened appreciably by water.

The allyloxyacetic acid/butyl methacrylate copolymer of Example II was converted to an air-drying composition by heating a mixture of 103.8 parts of this copolymer, 66 parts of allyloxyethanol, 32.0 parts of decyl alcohol, and 30 parts of toluene, for 40 hours at 133° C.–197° C. The final product had a viscosity of 3 poises at 25° C. at 75% concentration in xylene and an acid number of 12.2. Thin films of this product, containing 0.05% cobalt as cobalt naphthenate, air-dried to tough, flexible coatings in about 24 hours. This ester is particularly useful in vehicles for interior and exterior paints.

Polyesters with polyhydric alcohols such as ethylene glycol, propylene glycol, glycerol, and the like, are useful in coating compositions to impart hardness and improved drying characteristics. The various polyesters are also useful as molding resins, and as impregnants for paper and other bibulous substrates. When modified with pigments, resins, plasticizers, and the like, products possessing new and unique properties of value are obtained.

The polymeric material of this invention obtained by the copolymerization of allyloxyacetic acid with another polymerizable ethylenically unsaturated monomer such as acrylonitrile, is useful for conversion to films, fibers, and the like, which have improved dye receptivity and solubility characteristics. The copolymers with vinyl chloride, especially where the allyloxyacetic acid content is at least 30% (Examples XI, XII, and XXIII), are particularly adapted for conversion into polyesters which are highly valuable components in coating systems where non-yellowing tendencies upon aging are prime requisites as in white enamels for refrigerators, washing machines, and the like. The copolymers of vinyl acetate are useful in moldings, hot melt and solution adhesives, and coating compositions. Further, in their hydrolyzed form, they yield products which have remarkable versatility because of their dual functionality through the presence of hydroxyl and carboxyl groups in the molecule.

The copolymers of this invention are prepared by copolymerizing together, in suitable proportion, the allyloxyacetic acid and the other polymerizable monomer. The relative proportions of polymerized allyloxyacetic acid and other polymerized component or components in the resulting polymer are usually fairly close to their relative proportions in the monomeric mixture. However, the actual composition of the resin depends on the polymerizing characteristics of the monomer being copolymerized with the allyloxyacetic acid and the particular conditions of copolymerization.

In the preparation of the instant polymeric material it is desirable to include a polymerization accelerator in the charge, in order to achieve a practical rate of reaction. The preferred accelerators are those which yield unstable free radicals under the conditions of reaction. Examples of such accelerators are organic and inorganic peroxides, e. g., hydrogen peroxide, benzoyl peroxide, tert.- butyl hydroperoxide, diethyl peroxide, and similar peroxides, and azo compounds described in U. S. Patent 2,371,951 such as alpha,alpha'-azodiisobutyronitrile; alpha,-apha' - (alpha,gamma - dimethylvaleronitrile); dimethyl alpha,alpha'-azodiisobutyrate; 1,1'-azodicyclohexanecarbonitrile and the like.

The amount of accelerator can be as low as 0.1% by weight of the monomer or monomers being polymerized or as high as 10% by weight of such monomer or monomers. Usually, adequate reaction rates with good yields of product are obtained employing 0.5% by weight of accelerator.

The polymerization can be carried out under a variety of conditions. Although not essential, it is convenient in practice to use a liquid medium which dissolves the monomers and accelerator. Any inert reaction medium can be used including those which are solvents for the copolymers. Examples of suitable reaction media are benzene, toluene, the xylenes, dioxane, methyl isobutyl ketone and the like. If desired, the polymerization can be effected in an aqueous medium with or without dispersing or emulsifying agents.

The polymerization temperature is not critical. At low temperatures, e. g., 0° C. to 10° C., the reaction is slow. It is usually desirable to operate at temperatures above 25° C. and preferably between 40° C. and 180° C. At the high temperatures, i. e., at temperatures of from 125° C. to 180° C., products of low molecular weight are obtained. The copolymers can be prepared under autogenous pressure, at atmospheric pressure, or under externally applied pressure up to 1000 or more atmospheres, depending upon the particular monomer being copolymerized with the allyloxyacetic acid.

An advantage of the present invention is that it provides a new polymeric material adapted for a wide variety of uses. A particular advantage is that it provides a polymeric material having carboxyl groups in lateral substituent units of the main polymer chain, such carboxyl groups being readily neutralized with alkaline substances or esterified with alcohols to give a series of products having diversified properties. An outstanding advantage of the invention is that it provides copolymers of allyloxyacetic acid adapted to be esterified to give polymeric products of merit for use in air-drying coating compositions.

As many apparently widely different embodiments of this invention may be made without departing from the spirit and scope thereof, it is to be understood that the invention is not limited to the specific embodiments thereof except as defined in the appended claims.

The invention claimed is:

1. A copolymer, the polymeric components of which comprise at least 1% of polymerized allyloxyacetic acid by weight thereof and a polymerized monoethylenically unsaturated compound in which the ethylenic unsaturation is terminal.

2. A copolymer, the polymeric components of which comprise at least 30% of polymerized allyloxyacetic acid by weight thereof and a polymerized monoethylenically unsaturated compound in which the ethylenic unsaturation is terminal.

3. A copolymer, the polymeric components of which comprise 40% to 75% of polymerized allyloxyacetic acid by weight thereof and a polymerized monoethylenically unsaturated compound in which the ethylenic unsaturation is terminal.

4. A copolymer, the polymeric components of which essentially consist of at least 30% of polymerized allyloxyacetic acid by weight thereof and the remainder a polymerized monoethylenically unsaturated compound in which the ethylenic unsaturation is terminal.

5. A copolymer, the polymeric components of which essentially consist of at least 30% of polymerized allyloxyacetic acid by weight thereof and the remainder polymerized vinyl acetate.

6. A copolymer, the polymeric components of which essentially consist of 40% to 75% of polymerized allyloxyacetic acid by weight thereof and the remainder a polymerized monoethylenically unsaturated compound in which the ethylenic unsaturation is terminal.

7. A copolymer, the polymeric components of which essentially consist of 40% to 75% of polymerized allyloxyacetic acid by weight thereof and the remainder polymerized vinyl acetate.

HENRY SHIRLEY ROTHROCK.

REFERENCES CITED

The following references are of record in the file of this patent:

UNITED STATES PATENTS

| Number | Name | Date |
| --- | --- | --- |
| 2,406,590 | D'Alelio | Aug. 27, 1946 |